US012464284B2

(12) United States Patent
Tachi

(10) Patent No.: US 12,464,284 B2
(45) Date of Patent: Nov. 4, 2025

(54) COMMUNICATION SUPPORT SYSTEM

(71) Applicant: Alps Alpine Co., LTD., Tokyo (JP)

(72) Inventor: Ryosuke Tachi, Fukushima (JP)

(73) Assignee: Alps Alpine Co., LTD., Tokyo (JP)

( * ) Notice: Subject to any disclaimer, the term of this patent is extended or adjusted under 35 U.S.C. 154(b) by 267 days.

(21) Appl. No.: 18/196,014

(22) Filed: May 11, 2023

(65) Prior Publication Data

US 2023/0396922 A1 Dec. 7, 2023

(30) Foreign Application Priority Data

Jun. 7, 2022 (JP) ................................. 2022-092156

(51) Int. Cl.
*G10K 11/178* (2006.01)
*H04R 1/10* (2006.01)
*H04R 3/04* (2006.01)

(52) U.S. Cl.
CPC ......... *H04R 3/04* (2013.01); *G10K 11/17854* (2018.01); *H04R 1/1083* (2013.01)

(58) Field of Classification Search
CPC ....... G10K 11/17854; G10K 11/17883; G10K 2210/1282; G10K 2210/12821; G10K 2210/12822; G10L 25/51; G10L 21/02; G10L 21/0208; G10L 2021/02082; H04R 2499/13
See application file for complete search history.

(56) References Cited

U.S. PATENT DOCUMENTS

| | | | | |
|---|---|---|---|---|
| 4,965,833 | A * | 10/1990 | McGregor | H04M 9/087 381/86 |
| 2002/0071573 | A1 | 6/2002 | Finn | |
| 2004/0158460 | A1* | 8/2004 | Finn | H04R 3/02 704/205 |
| 2007/0174050 | A1* | 7/2007 | Li | G10L 21/02 704/E21.009 |
| 2010/0329488 | A1 | 12/2010 | Holub | |

FOREIGN PATENT DOCUMENTS

| | | |
|---|---|---|
| JP | 6-266374 | 9/1994 |
| JP | 3244062 B2 * | 1/2002 |
| JP | 2002-051392 | 2/2002 |
| JP | 2006-203553 | 8/2006 |
| JP | 2010-016564 | 1/2010 |
| WO | WO2010/001508 | 1/2010 |

OTHER PUBLICATIONS

European Search Report, dated Sep. 22, 2023, pp. 1-9, issued in Application No. 23175050.6, European Patent Office, Munich Germany.

* cited by examiner

*Primary Examiner* — James K Mooney
(74) *Attorney, Agent, or Firm* — Crowell & Moring LLP

(57) ABSTRACT

An assist band is set to a standard band when there is no large road noise, and is set to a treble band not including a low frequency band but including a high frequency band as compared with the standard band when there is a large road noise. In audio data of a front seat microphone, components outside the assist band are cut by an IIR filter, downsampled by a downsampling unit to a sampling frequency that is twice the upper limit of the assist band, processed by an echo canceller and a howling canceller, upsampled by an upsampling unit, and output to a rear seat speaker. When there is a large road noise, the operation of the howling canceller is invalidated, and the input is output as it is.

6 Claims, 5 Drawing Sheets

COMMUNICATION SUPPORT SYSTEM

RELATED APPLICATION

The present application claims priority to Japanese Patent Application Number 2022-092156, filed Jun. 7, 2022, the entirety of which is hereby incorporated by reference.

BACKGROUND

1. Field of the Disclosure

The present disclosure relates to a technology for supporting communication by speech between users in different areas in an automobile.

2. Description of the Related Art

As a technique for supporting communication based on speech between users in different areas in an automobile, a technique for collecting speech voices of users in a first area of the automobile with a microphone in the first area, and outputting, from a speaker in a second area, the speech voices of which a gain has been adjusted so that the users in the second area can clearly hear the speech voice is known (for example, JP 2002-51392 A).

Furthermore, as a technique for supporting communication based on speech in a vehicle, as illustrated in FIG. 5A, in a system for supporting a conversation between a user in a first area and a user in the second area by outputting, from a speaker 512 in a second area, a voice of the user picked up by a microphone 501 in the first area and outputting, from a speaker 502 in the first area, a voice of the user picked up by a microphone 511 in the second area, there is also known an echo cancellation technique in which an echo canceller 520 cancels out an echo introduced from the speaker 512 in the second area and routed to the microphone 511 in the second area (for example, JP 2010-16564 A).

The echo canceller 520 includes an adaptive filter 521 that receives the output of the microphone 501 in the first area as an input, and an adder 522 that adds the output of the adaptive filter 521 and the output of the microphone 511. In the second area and outputs the result to the speaker 502 in the first area, and cancels an echo by performing an adaptive operation using the output of the adder 522 as an error in the adaptive filter 521.

In addition, there is also known a howling canceller technique for canceling out howling using an adaptive filter (for example, JP 2006-203553 A).

FIG. 5B illustrates a configuration in which such a howling canceller 530 is applied to suppress occurrence of howling due to sound introduced from the speaker 502 in the first area and routed to the microphone 511 in the second area.

As illustrated in the drawing, the howling canceller 530 includes an adaptive filter 531 and an adder 532 that adds the output of the adaptive filter 531 and the output of microphone 511 in the second area and outputs the result to the speaker 502 in the first area. The output of the adder 532 is used as an input of the adaptive filter 531, and the adaptive filter 531 performs an adaptive operation using the output of the adder 532 as an error, thereby suppressing occurrence of howling due to sound introduced from the speaker 502 in the first area and routed to the microphone 511 in the second area.

There is also known a road noise canceller technique for canceling out road noise of an automobile using an adaptive filter (for example, JP H6-266374 A).

FIG. SC illustrates a configuration in which such a road noise canceller 540 is applied to cancel road noise audible to the user in the first area.

As illustrated in the drawing, the road noise canceller 540 includes an adaptive filter 541, an adder 542 that adds the output of the adaptive filter 541 and the output of the microphone 511 in the second area and outputs the result to the speaker 502 in the first area, and a reference signal generation unit 543.

The reference signal generation unit 543 generates and outputs a reference signal simulating node noise from an output of a sensor 550 that detects a signal correlated with road noise of an acceleration sensor or the like. Then, the reference signal output from the reference signal generation unit 543 is used as an input to the adaptive filter 541, and the adaptive filter 541 performs an adaptation operation with the output of the microphone 501 in the second area as an error, thereby suppressing road noise audible to the user in one area.

SUMMARY

In a case where communication based on speech between users in different areas inside the automobile is supported by collecting a speech voice of a user in a first area of the automobile with a microphone in the first area and outputting the collected speech voice from a speaker in a second area, if road noise becomes large due to high-speed traveling, the speech voice is buried in the road noise, and good support cannot be performed.

In addition, as illustrated in FIGS. 5A and 5B, in a case where an echo canceller or a howling canceller is provided to support mutual conversation between the user in the first area and the user in the second area, if the road noise increases, the adaptive operation of the adaptive filter diverges, and appropriate support may not be performed.

Therefore, an objective of the present disclosure is to satisfactorily support communication by speech between users in different areas even when a large road noise is being generated.

In order to achieve the above objective, the present disclosure provides a further communication support system that supports communication by speech between a user in a first area and a user in a second area in an automobile. In some forms, a communication support system includes a first area microphone that is a microphone disposed in the first area, a second area speaker that is a speaker disposed in the second area, a road noise detection unit that detects whether a large road noise is being generated, a control unit, and a voice processing unit that relays a voice picked up by the first area microphone to the second area speaker. Here, the control unit causes the voice processing unit to extract a component of a standard band, which is a preset frequency band, of the voice picked up by the first area microphone and to relay the extracted component to the second area speaker, during a period in which the road noise detection unit does not detect that a large road noise is being generated, and causes the voice processing unit to extract a component of a treble band, which is a preset frequency band that does not include at least a band of a lower frequency than the standard band but includes a band having a higher frequency than the standard band, of the voice picked up by the first area microphone and to relay the extracted component to the second area speaker, during a period in which the road noise detection unit detects that a large road noise is being generated.

In addition, in order to achieve the above object, the present disclosure provides yet another communication support system that supports communication by speech between a user in a first area and a user in a second area in an automobile. In some forms, a communication support system includes: a first area microphone that is a microphone disposed in the first area, a second area speaker that is a speaker disposed in the second area, a road noise detection unit that detects whether a large road noise is being generated, a control unit, and a first voice processing unit. The control unit sets a standard hand, which is a preset frequency band, as a target band during a period in which the road noise detection unit does not detect that a large road noise is being generated, and sets a treble band, which is a preset frequency band that does not include at least a band of a lower frequency than the standard band but includes a band having a higher frequency than the standard band, as a target band during a period in which the road noise detection unit detects that a large road noise is being generated. Further, the first voice processing unit extracts a component of the target band of the voice picked up by the first area microphone, and outputs audio data representing the extracted component to the second area speaker. The first voice processing unit includes a downsampling unit that downsamples audio data representing a voice picked up by the first area microphone to audio data having a sampling frequency twice as high as an upper limit of the target band, a howling cancellation unit that receives, as an input, the audio data downsampled by the downsampling, unit, selectively performs howling cancellation processing of canceling out a component that is included in the input audio data and has been introduced from the second area speaker and routed to the first area microphone, and outputs the audio data subjected to the howling cancellation processing; and an upsampling unit that upsamples the audio data output from the howling cancellation unit and outputs the audio data toward the second area speaker. Further, the control unit causes the howling cancellation unit to perform the howling cancellation process during a period in which the road noise detection unit does not detect that a large road noise is being generated, stops the howling cancellation processing performed by the howling cancellation unit during a period in which the road noise detection unit detects that a large road noise is being generated, and outputs the audio data input to the howling cancellation unit as it is.

In order to achieve the above objective, the present disclosure provides a further communication support system that supports communication by speech between a user in a first area and a user in a second area in a vehicle. In some forms, a communication support system including a first area microphone that is a microphone disposed in the first area, a first area speaker that is a speaker disposed in the first area, a second area microphone that is a microphone disposed in the second area, a second area speaker that is a speaker disposed in the second area, a road noise detection unit that detects whether a large road noise is being generated, a control unit, and a first voice processing unit; and a second voice processing unit.

The control unit sets a standard band, which is a preset frequency band, as a target band during a period in which the road noise detection unit does not detect that a large road noise is being generated, and sets a treble band, which is a preset frequency band that does not include at least a band of a lower frequency than the standard band but includes a band having a higher frequency than the standard band, as a target band during a period in which the road noise detection unit detects that a large road noise is being generated.

Further, the first voice processing unit extracts a component of the target band of the voice picked up by the first area microphone and outputs audio data representing the extracted component to the second area speaker, and the second voice processing unit extracts a component of the target band of the voice picked up by the second area microphone and outputs audio data representing the extracted component to the first area speaker.

In addition, the first voice processing unit further includes a downsampling unit that downsamples audio data representing a voice picked up by the first area microphone to audio data having a sampling frequency that is twice the upper limit of the target band, an echo cancellation unit that performs an echo cancellation process of canceling out a component that is included in the audio data downsampled by the downsampling unit and has been introduced from the first area speaker and routed to the first area microphone, and outputs the audio data subjected to the echo cancellation processing; and an upsampling unit that upsamples the audio data output from the echo cancellation unit and outputs the audio data toward the second area speaker.

Here, in the communication support system including the first voice processing unit and the second voice processing unit described above, a road noise cancellation unit may be provided for applying both the echo cancellation unit and the howling cancellation unit described above to the audio data to be output to the second area speaker by the first voice processing unit.

According to forms of the communication support systems as described above, during a period in which a large road noise is being generated, a low frequency band in which road noise is concentrated is excluded, and only a treble band that is a frequency band including a high sound band in which sound easily passes is relayed to a speaker for a user in another area from a voice of the user picked up by a microphone. Therefore, even when a large road noise is being generated, communication based on a speech between users can be supported relatively well.

As described above, according to implementations of the present disclosure, even when a large road noise is being generated, it is possible to satisfactorily support communication by speech between users in different areas.

DETAILED DESCRIPTION

Hereinafter, embodiments and implementations of the present disclosure will be described by taking an application to an in-vehicle system that supports communication by speech in a vehicle between a user in a front seat and a user in a rear seat of an automobile as an example.

Figure 1A:
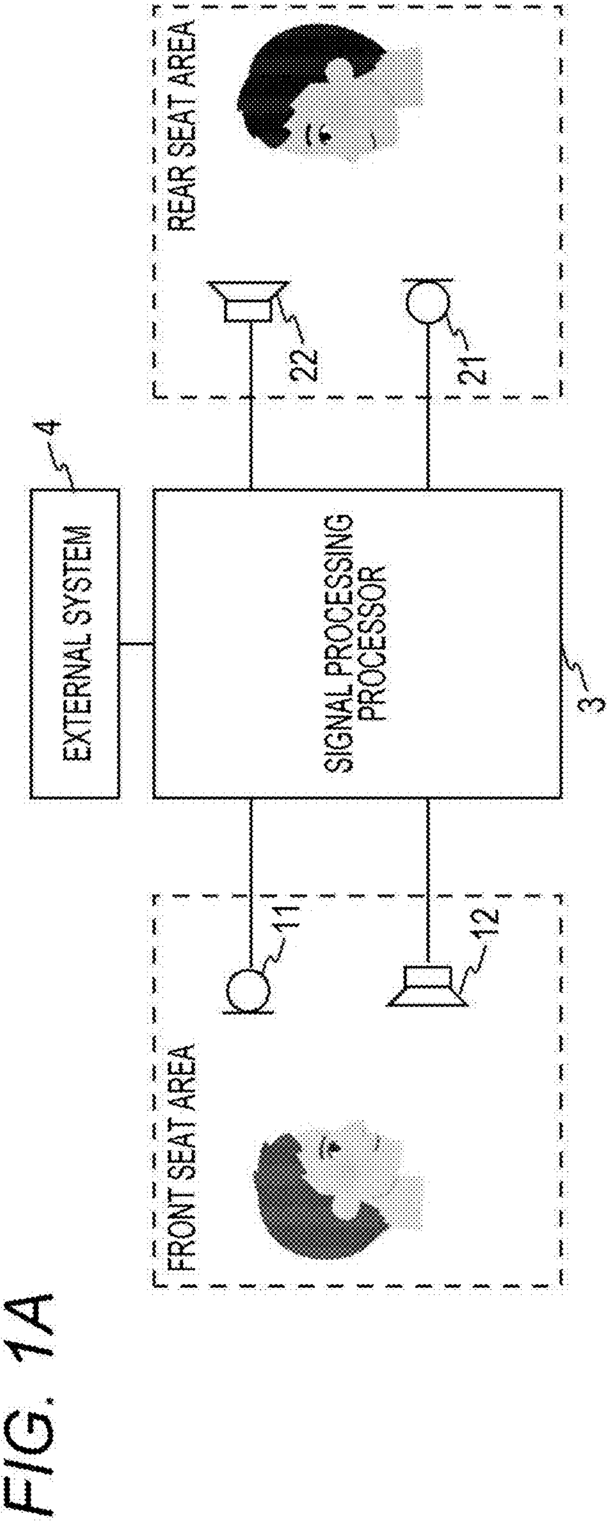
FIGS. 1A and 1B are block diagrams illustrating a configuration of an in-vehicle system according to an embodiment of the present disclosure.

FIG. 1A illustrates a configuration of an in-vehicle system. The in-vehicle system is a system mounted on an automobile, and includes, as illustrated in the drawing, a signal processing processor 3 to which the following units are connected: a front seat microphone 11 which is a microphone for a user in a front seat area in a vehicle interior, a front seat speaker 12 which is a speaker for a user in the front seat area, a rear seat microphone 21 which is a microphone for a user in a rear seat area in the vehicle interior, and a rear seat speaker 22 which is a speaker for a user in the rear seat area. In addition, the signal processing processor 3 is connected to an external system 4 that detects and manages various states of the automobile.

Here, the front seat microphone 11 and the rear seat microphone 21 output audio data having a predetermined sampling frequency representing picked up sound. In addition, the front seat speaker 12 and the rear seat speaker 22 emit voice represented by input audio data having a predetermined sampling frequency.

The signal processing processor 3 outputs the voice of the user in the rear seat area picked up by the rear seat microphone 21 in the rear seat area to the front seat speaker 12 in the front seat area, and outputs the voice of the user in the front seat area picked up by the front seat microphone 11 in the front seat area to rear seat speaker 22 in the rear seat area, thereby supporting communication by conversation between the user in the rear seat area and the user in the front seat area.

Figure 1B:
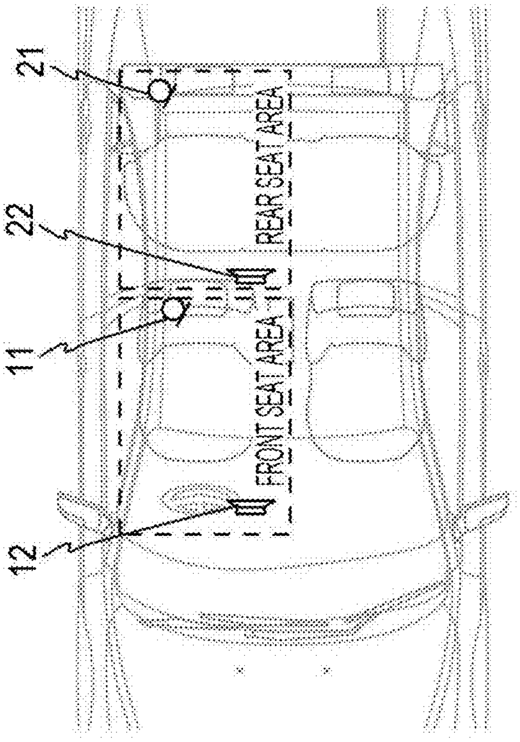

Here, as illustrated in FIG. 1B, the rear seat area is, for example, an area of a seat behind a driver's seat of an automobile, and the rear seat speaker 22 and the rear seat microphone 21 are disposed in the rear seat area. In addition, the front seat area is an area of a driver's seat of an automobile, and front seat speaker 12 and front seat microphone 11 are disposed in the front seat area.

Figure 2:
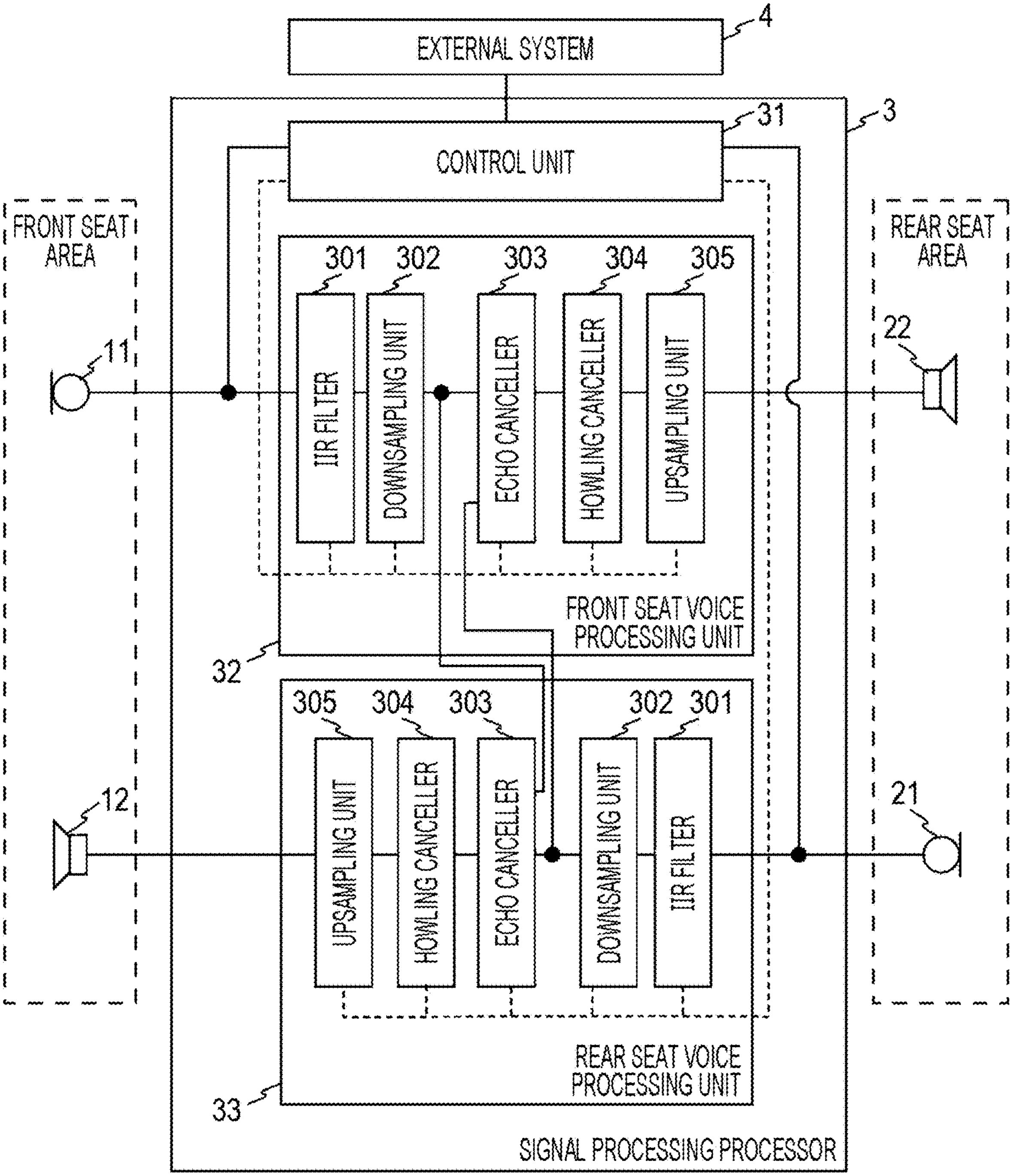
FIG. 2 is a block diagram illustrating a configuration of a signal processing processor according to an embodiment of the present disclosure.

Next, FIG. 2 illustrates a functional configuration of the signal processing processor 3.

Here, each functional unit is implemented by software processing, and each functional unit shares the same resources as those of the signal processing processor 3.

As illustrated in the drawing, the signal processing processor 3 includes, as functional units, a control unit 31, a front seat voice processing unit 32 that processes a voice picked up by the front seat microphone 11 and output to the rear seat speaker 22, and the rear seat voice processing unit 33 that processes a voice picked up by the rear seat microphone 21 and output to the front seat speaker 12.

The front seat voice processing unit 32 and the rear seat voice processing unit 33 have the same configuration, and each include an HR filter 301, a downsampling unit 302, an echo canceller 303, a howling canceller 304, and an upsampling unit 305.

Operations of the front seat voice processing unit 32 and the rear seat voice processing unit 33 will be described below.

An operation of each unit of the front seat voice processing unit 32 will be described first.

The IIR filter 301 is a frequency filter that receives audio data output from the front seat microphone 11 as an input, and an output of the IIR filter 301 is output to the downsampling unit 302. The downsampling unit 302 downsamples the audio data input from the IIR filter 301 and converts the sampling frequency into a lower sampling frequency.

The echo canceller 303 cancels a component correlated with audio data output from the downsampling unit 302 of the rear seat voice processing unit 33 from the audio data output from the downsampling unit 302, thereby canceling out and outputting an echo introduced from the front seat speaker 12 and routed to the front seat microphone 11.

Figure 5A:
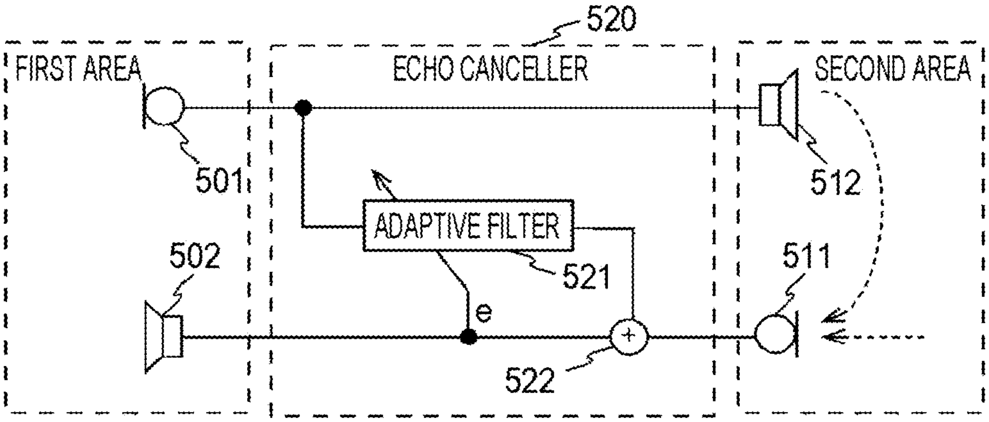
FIGS. 5A to 5C are diagrams illustrating a known echo canceller, a howling canceller, and a road noise canceller.

Here, as the configuration of the echo canceller 303, for example, the configuration of the echo canceller 520 illustrated in FIG. 5A can be used.

The howling canceller 304 cancels a component correlated with the audio data already output from the howling canceller 304 to remove a voice component introduced from the rear seat speaker 22 and routed to the front seat microphone 11 from the audio data output from the downsampling unit 302, thereby suppressing occurrence of howling.

Figure 5B:
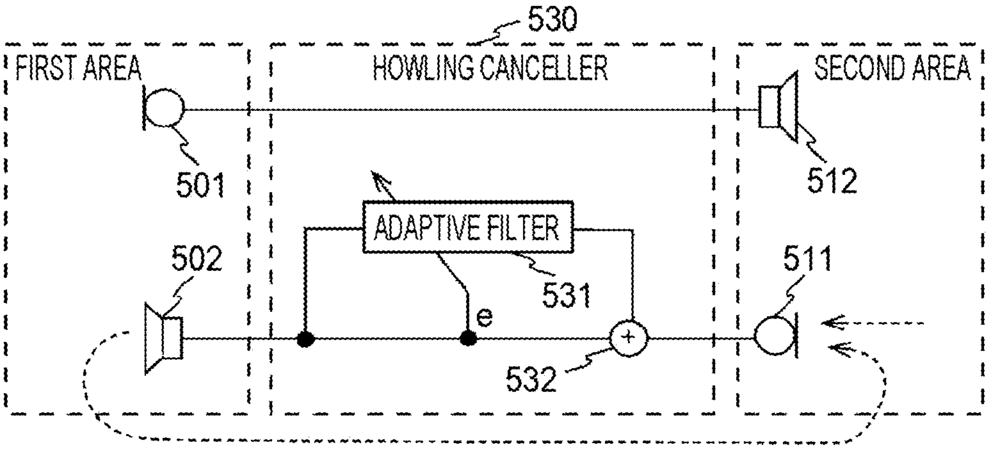

Here, as the configuration of howling canceller 304, for example, the configuration of howling canceller 530 shown in FIG. 5B can be used.

The upsampling unit 305 then upsamples the audio data output from the howling canceller 304 by interpolation, generates audio data having a predetermined sampling frequency for output from the speakers, and outputs the audio data to the rear seat speaker 22.

Here, the filter characteristics of the IIR filter 301, the sampling frequency of the audio data downsampled by the downsampling unit 302, and the characteristics of the upsampling performed by the upsampling unit 305 can be controlled and changed by the control unit 31.

Next, the operations of the respective units of the rear seat voice processing unit 33 are described by replacing "front seat" and "rear seat" in the above description of the operations of the respective units of the front seat voice processing unit 32.

Hereinafter, the operation of the control unit 31 will be described.

Figure 3:
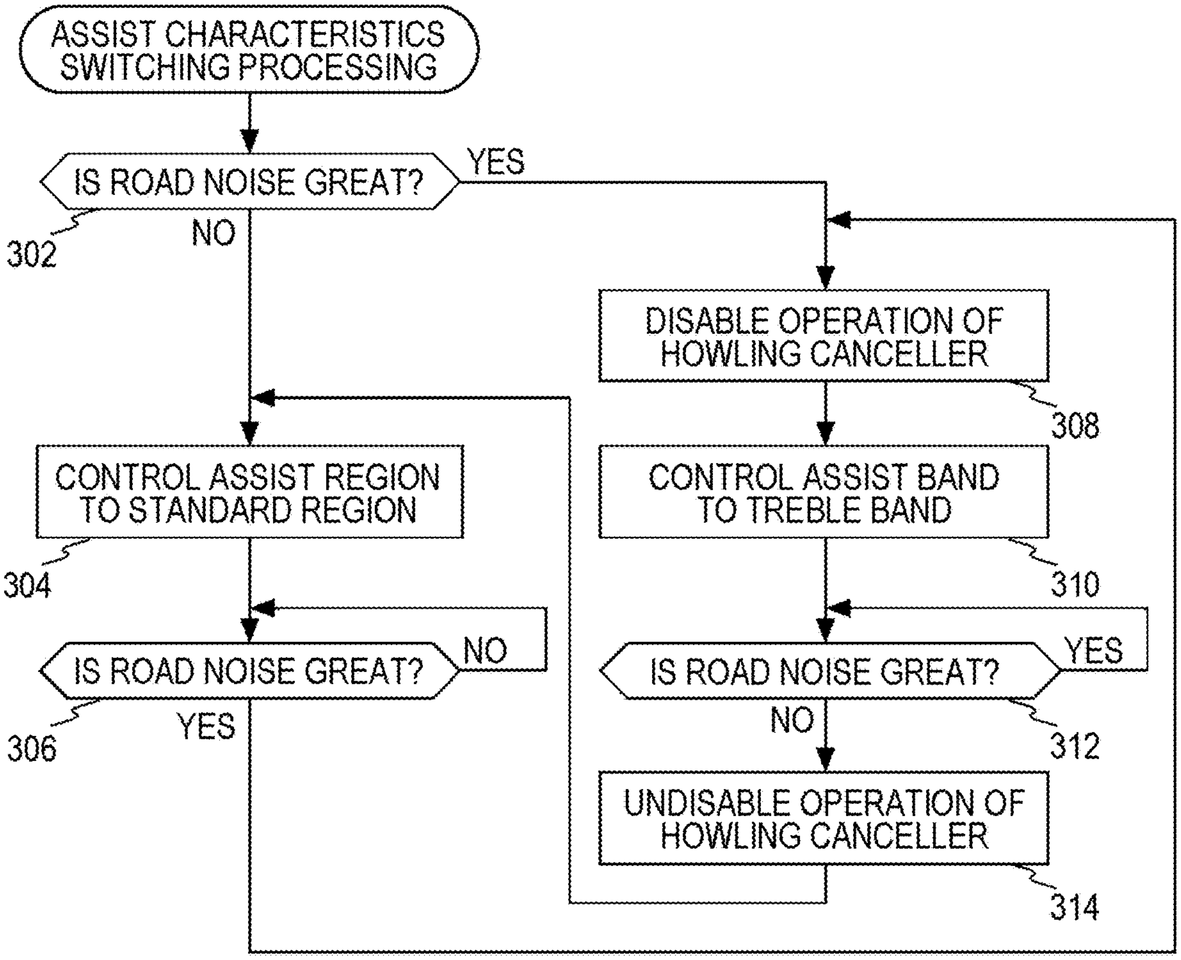
FIG. 3 is a flowchart illustrating assist characteristic switching processing according to an embodiment of the present disclosure.

FIG. 3 illustrates a procedure of the assist characteristic switching processing performed by the control unit 31. Here, in the following description, it is assumed that sampling frequencies of audio data output from front seat microphone 11 and the rear seat microphone 21 and sampling frequencies of input audio data input from the front seat speaker 12 and the rear seat speaker 22 are both 36 kHz.

As illustrated in the drawing, the control unit 31 checks whether the road noise is currently large in the assist characteristic switching processing (step 302).

Here, in step 302, in a case where a level of components of 1 kHz or less having a large correlation with each other, included in outputs of the front seat microphone 11 and the rear seat microphone 21, is larger than a predetermined threshold, it is determined that the road noise is currently large.

Alternatively, in step 302, information on the automobile speed and the rotation speed of the automobile is acquired from the external system 4, and when the acquired information indicates that the vehicle is continuously traveling at a high speed of a predetermined speed or more for a predetermined time or more, it is determined that the road noise is currently large.

Then, when it is determined that the road noise is not currently large (step 302), the assist band is controlled to be the standard band (step 304).

Here, the assist band indicates a frequency band of the output of the front seat microphone 11 that the signal processing processor 3 targets for relaying to the rear seat speaker 22 and indicates the frequency band of the output of the rear seat microphone 21 that the signal processing processor 3 targets for relaying to the front seat speaker 12.

The standard band is, for example, a band of 1200 Hz or less.

In a case where the standard band is the band of 1200 Hz or less, in step 304, in order to set the assist band to the band of 1200 Hz or less, the filter characteristic of the HR filter 301 is set to the filter characteristic for cutting off the component of the frequency band exceeding 1200 Hz, and the sampling frequency after the downsampling of the downsampling unit 302 is set to 2400 Hz.

Here, by setting the filter characteristic of the IIR filter 301 to cut off a low-frequency component exceeding ½ of the sampling frequency after the downsampling, anti-aliasing is performed to prevent appearance of the folded noise in the audio data after the downsampling. Furthermore, the sampling frequency after the downsampling of the downsampling unit 302 is set to 2400 Hz in order to remove an unnecessary frequency band exceeding 1200 Hz and to reduce the processing amount after the sample rate of the audio data is reduced.

In step 304, echo canceller 303 and howling canceller 304 are set to process the audio data having the sampling frequency of 2400 Hz, and upsampling unit 305 is set to upsample the audio data having the sampling frequency of 2400 Hz into the audio data having the sampling frequency of 36 kHz. In addition, the upsampling unit 305 is set, to perform upsampling so that the audio data to be output does not include a component exceeding 1200 Hz.

Then, it is repeatedly checked whether the road noise is currently large until it is determined that the road noise is large (step 306), and when it is determined that the road noise is large, the processing proceeds to step 308.

On the other hand, in a case where it is determined in step 302 that the road noise is currently large, the processing also proceeds to step 308.

When the processing proceeds from step 302 or step 306 to step 308, the operations of the howling canceller 304 in the front seat voice processing unit 32 and the rear seat voice processing unit 33 are invalidated.

Here, the howling canceller 304 whose operation is invalidated performs a through operation of outputting input audio data as it is.

Then, next, control is performed to set the assist band to the treble band (step 310).

The high sound band does not include the low frequency band included in the standard band but includes a band having a higher frequency than the standard band. For example, the treble band is a band from 1 kHz to 10 kHz.

In a case where the treble band is a band from 1 kHz to 10 kHz, in step 310, in order to set the assist band from 1 kHz to 10 kHz, the filter characteristic of the IIR filter 301 is set to a filter characteristic for cutting off a component in a frequency band other than the frequency band from 1 kHz to 10 kHz, and the sampling frequency after the downsampling of the downsampling unit 302 is set to 20 kHz.

In step 310, echo canceller 303 and howling canceller 304 are set to process the audio data having the sampling frequency of 20 kHz, and upsampling unit 305 is set to upsample the audio data having the sampling frequency of 20 kHz into the audio data having the sampling frequency of 36 kHz. In addition, the upsampling unit 305 performs upsampling so that the audio data to be output does not include a component of a frequency band other than the frequency band of 1 kHz to 10 kHz.

Then, it repeatedly checks whether the road noise is currently large until it is determined that the road noise is not large (step 312). When it is determined that the road noise is not large, the invalidation of operation of the howling canceller 304 of the front seat voice processing unit 32 and the rear seat voice processing unit 33 is canceled (step 314), and the processing proceeds from step 304. Here, the howling canceller 304 whose invalidation of the operation has been released restarts the operation for suppressing howling described above.

The assist characteristic switching processing performed by the control unit 31 has been described above.

According to such an assist characteristic switching processing, the operations of the front seat voice processing unit 32 and the rear seat voice processing unit 33 are performed with the assist band as the standard band (for example, a band of 1200 Hz or less) when the road noise is not large, and with the assist band as the treble band (for example, a band from 1 kHz to 10 kHz) not including the low frequency band included in the standard band but including the band having a higher frequency than the standard band when the road noise is large.

Here, when the road noise that hinders the collection and listening of the speech voice is not large, even if the assist band is set to a low frequency band, it is possible to sufficiently support the communication based on the speech between the user in the front seat and the user in the rear seat of the automobile.

Further, when the road noise is not large, the echo canceller 303, the howling canceller 304, and the like are operated for the audio data having a low sampling frequency, so that the processing road of the signal processing processor 3 can be suppressed to be small.

On the other hand, even when the road noise is large, the high-frequency voice can be picked up by the front seat microphone 11 and the rear seat microphone 21 relatively well and can be heard by the user relatively well.

In addition, since the road noise is concentrated in a low frequency band lower than 1 kHz, this low frequency band is excluded from the processing target, and the processing is performed only for a high frequency band, whereby the occurrence of divergence of the adaptive operation of the adaptive filter of the echo canceller 303 or the howling canceller 304 is suppressed.

Therefore, according implementations in which the assist band is the treble band (for example, a band from 1 kHz to 10 kHz) not including the low frequency band included in the standard band but including the band having a higher frequency than the standard band when the road noise is large, it is possible to support communication by speech between the user in the front seat and the user in the rear seat of the automobile as well as possible even when the road noise is large.

In addition, when the road noise is large, the echo canceller 303 and the like are operated for audio data having a high sampling frequency. Therefore, the processing road of the signal processing processor 3 increases accordingly, but instead, the operation of the howling canceller 304 is invalidated, so that an increase in the processing road of the signal processing processor 3 can be suppressed.

Here, when the road noise is large, the S/N of the path in which the howling sound loops due to disturbance becomes small, and howling hardly occurs. In addition, since the speaker usually has high directivity in a high frequency band, howling hardly occurs in the high frequency band.

Accordingly, invalidating the operation of the howling canceller 304 causes no significant problem when a treble band is set as a frequency band to be relayed by front seat voice processing unit 32 and the rear seat voice processing unit 33 due to large road noise.

Here, a road noise canceller that cancels road noise may be further provided as a functional unit of the signal processing processor 3 in the above embodiment.

Figure 4:
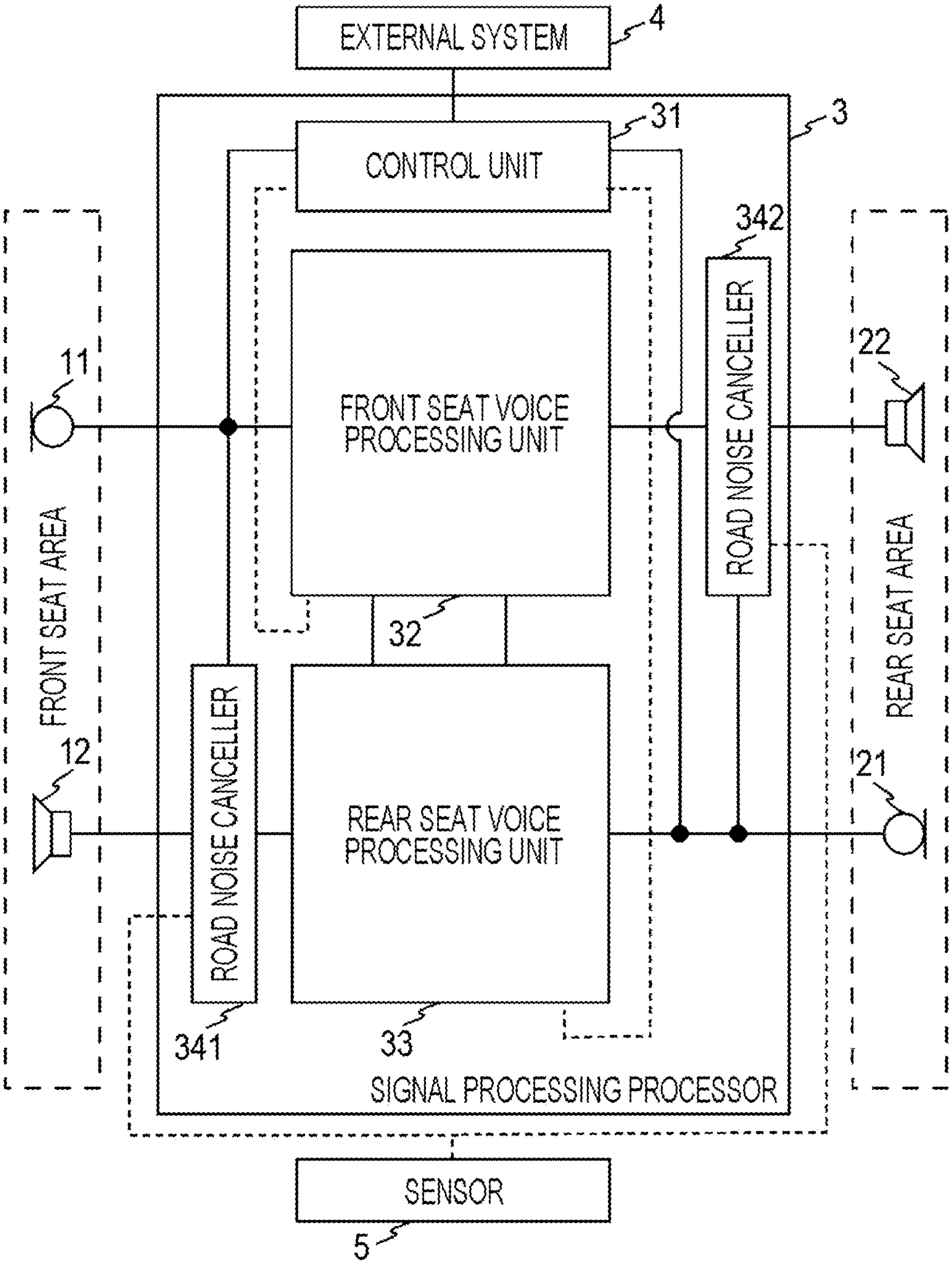
FIG. 4 is a block diagram illustrating another configuration example of the signal processing processor according to an embodiment of the present disclosure.

In other words, in this case, for example, as illustrated in FIG. 4, a road noise canceller 341 that generates a cancellation sound so that the component correlated with the road noise contained in the output of the front seat microphone 11 is minimized using the output of the sensor 5 that detects a signal correlated with road noise, such as an acceleration sensor, and the output of the front seat microphone 11 and cancels road noise in the front seats by adding cancellation sound to the audio data output from the rear seat voice processing unit 33 and outputting the audio data to the front seat speaker 12 and a road noise canceller 342 that generates a cancellation sound so that the component correlated with the road noise contained in the output of the rear seat microphone 21 is minimized using the output of the sensor 5 and the output of the rear seat microphone 21 and cancels road noise in the rear seats by adding the cancellation sound to the audio data output from the front seat voice processing unit 32 and outputting the audio data to the rear seat speakers 22 are provided.

Figure 5C:
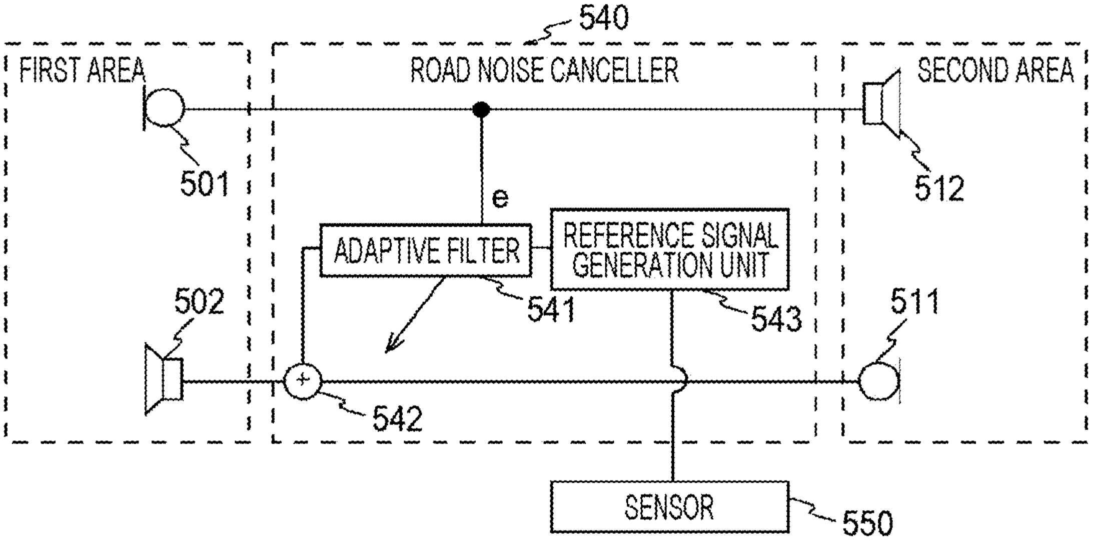

Here, as a configuration of the road noise canceller 341/342, for example, a configuration of road noise canceller 540 illustrated in FIG. 5C can be used.

Furthermore, in the above embodiment, the application to the support of communication by speech between the front seat and the rear seat has been described as an example, but the above embodiment can be similarly applied to a case of supporting communication by speech between seats in a combination of arbitrary seats other than the front seat and the rear seat.

In each of the above embodiments, the number of areas is two, but the present embodiment may be expanded to correspond to three or more areas.

While there has been illustrated and described what is at present contemplated to be preferred embodiments of the present disclosure, it will be understood by those skilled in the art that various changes and modifications may be made, and equivalents may be substituted for elements thereof without departing from the true scope of the disclosure. In addition, many modifications may be made to adapt a particular situation to the teachings of the disclosure without departing from the central scope thereof. Therefore, it is intended that this disclosure not be limited to the particular embodiments disclosed, but that the disclosure will include all embodiments falling within the scope of the appended claims.

The invention claimed is:

1. A communication support system that supports communication by speech between a user in a first area and a user in a second area in an automobile, the communication support system comprising:

a first area microphone that is disposed in the first area;
a second area speaker that is disposed in the second area;
a road noise detection unit that is configured to detect whether a large road noise is being generated;
a control unit; and
a voice processing unit that is configured to relay a voice picked up by the first area microphone to the second area speaker;
wherein the control unit is configured to:
cause the voice processing unit to extract a component of a standard band that is a preset frequency band of the voice picked up by the first area microphone and to relay the extracted component to the second area speaker, during a period in which the road noise detection unit does not detect that the road noise is being generated, and
cause the voice processing unit to extract a component of a treble band, which is a preset frequency band that does not include at least a band on a low frequency side of the standard band but includes a band having a higher frequency than the standard band of the voice picked up by the first area microphone and to relay the extracted component to the second area speaker, during a period in which the road noise detection unit detects that the road noise is being generated.

2. A communication support system that supports communication by speech between a user in a first area and a user in a second area in an automobile, the communication support system comprising:

a first area microphone disposed in the first area;
a second area speaker disposed in the second area;
a road noise detection unit that detects whether a road noise is being generated;
a control unit, and
a first voice processing unit;
wherein the control unit is configured to set a standard band, which is a preset frequency band, as a target band during a period in which the road noise detection unit does not detect that the road noise is being generated and sets a treble band, which is a preset frequency band that does not include at least a band on a low frequency side of the standard band but includes a band having a higher frequency than the standard band, as the target band during a period in which the road noise detection unit detects that the road noise is being generated;
wherein the first voice processing unit is configured to extract a component of the target band of a voice picked up by the first area microphone, and to output audio data representing the extracted component to the second area speaker;
wherein the first voice processing unit includes:
a downsampling unit that is configured to downsample audio data representing the voice picked up by the first area microphone into audio data having a sampling frequency twice an upper limit of the target band,
a howling cancellation unit that is configured to receive, as an input, the audio data downsampled by the downsampling unit, selectively perform howling cancellation processing of canceling out a component that is included in the input audio data and has been introduced from the second area speaker and routed to the first area microphone, and output the downsampled audio data on which the howling cancellation processing has been performed, and
an upsampling unit that is configured to upsample the audio data output from the howling cancellation unit and to output the upsampled audio data to the second area speaker; and
wherein the control unit is configured to:
cause the howling cancellation unit to perform the howling cancellation processing during the period in which the road noise detection unit does not detect that the road noise is being generated,
stop the howling cancellation processing performed by the howling cancellation unit during the period in which the road noise detection unit detects that the road noise is being generated, and output the audio data that is input to the howling cancellation unit.

3. The communication support system according to claim 2, further comprising:

a second area microphone disposed in the second area;

a first area speaker disposed in the first area; and a second voice processing unit;

wherein the second voice processing unit is configured to extract a component of the target band of a voice picked up by the second area microphone and output audio data representing the extracted component to the first area speaker, and wherein the first voice processing unit includes an echo cancellation unit that is configured to perform echo cancellation processing of canceling a component that is included in the audio data downsampled by the downsampling unit and has been introduced from the first area speaker and routed to the first area microphone.

4. The communication support system according to claim 3, further comprising:

a road noise cancellation unit that is configured to generate a cancellation sound for canceling road noise in the second area based on the voice picked up by the second area microphone, and to add the cancellation sound to the audio data output from the first voice processing unit.

5. A communication support system that supports communication by speech between a user in a first area and a user in a second area in an automobile, the communication support system comprising:

a first area microphone disposed in the first area;

a first area speaker disposed in the first area;

a second area microphone disposed in the second area;

a second area speaker disposed in the second area;

a road noise detection unit that is configured to detect whether a road noise is being generated;

a control unit;

a first voice processing unit; and a second voice processing unit, wherein the control unit is configured to:

set a standard band, which is a preset frequency band, as a target band during a period in which the road noise detection unit does not detect that the road noise is being generated, and set a treble band, which is a preset frequency band that does not include at least a band on a low frequency side of the standard band but includes a band having a higher frequency than the standard band, as the target band during a period in which the road noise detection unit detects that the road noise is being generated;

wherein the first voice processing unit is configured to extract a component of the target band of a voice picked up by the first area microphone, and to output audio data representing the extracted component to the second area speaker, wherein the second voice processing unit is configured to extract a component of the target band of a voice picked up by the second area microphone, and to output audio data representing the extracted component to the first area speaker; and wherein the first voice processing unit includes:

a downsampling unit that is configured to downsample audio data representing the voice picked up by the first area microphone into audio data having a sampling frequency twice an upper limit of the target band, an echo cancellation unit that is configured to perform echo cancellation processing of canceling a component that is included in the audio data downsampled by the downsampling unit and has been introduced from the first area speaker and routed to the first area microphone, and to output audio data on which the echo cancellation processing has been performed, and an upsampling unit that is configured to upsample the audio data output from the echo cancellation unit and to output the upsampled audio data to the second area speaker.

6. The communication support system according to claim 5, further comprising:

a road noise cancellation unit that is configured to generate a cancellation sound for canceling road noise in the second area based on the voice picked up by the second area microphone, and to add the cancellation sound to the audio data output from the first voice processing unit.

* * * * *